3,377,101
PIVOTALLY ADJUSTABLE SEAT BACK
Arthur O. Radke, Shorewood, and Garth O. Hall, New Berlin, Wis., assignors to Bostrom Corporation, a corporation of Wisconsin
Filed Dec. 1, 1966, Ser. No. 598,487
3 Claims. (Cl. 297—283)

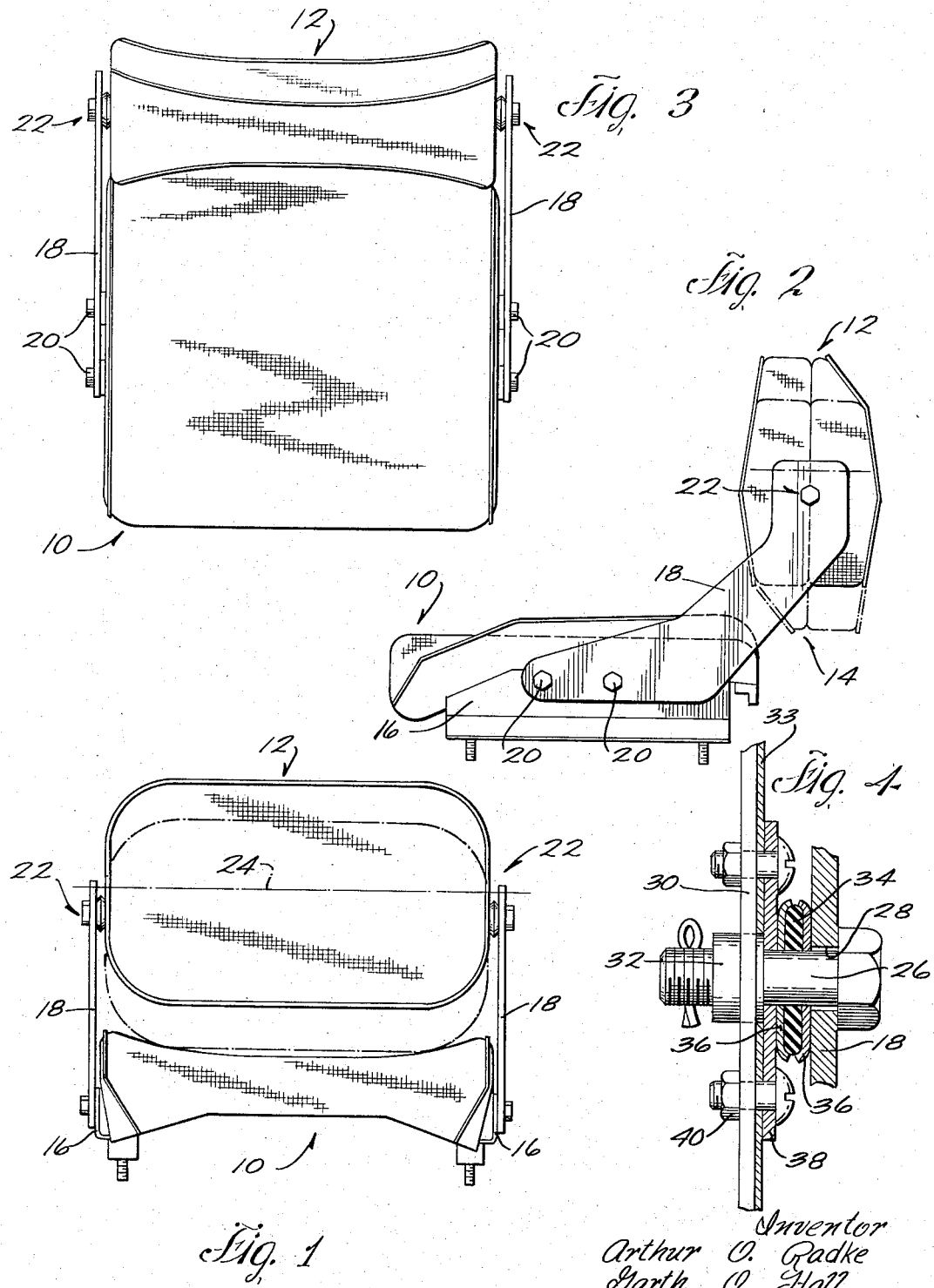

ABSTRACT OF THE DISCLOSURE

A back rest which has both sides upholstered and contoured for proper back support, pivotally connected to supporting structures which will permit the back height to be adjusted between two vertical positions by pivoting it through 180°.

---

This invention pertains to improvements in seating and particularly to a novel arrangement for varying the vertical position of the back part of a seat.

The principal object of the present invention is to provide a simple, yet very effective, height adjustment mechanism for the back part of a seat.

In essence, the inventive concept resides in providing a back part which has both its back and front sides upholstered or contoured for proper back support, and in pivotally connecting the back part to a suitable supporting structure at a point which is a substantially vertical distance removed from the vertical mid-point of the back part. Such arrangement will permit the back part height to be adjusted between two positions by pivoting it through 180° around an axis extending horizontally and transverse to the seat. Thus, the occupant of the seat will be able to change the height of the back part by merely imparting a turning motion to the part.

Other objects and advantages will be pointed out in, or be apparent from, the specification and claims, as will obvious modifications of the single embodiment shown in the drawings, in which:

FIG. 1 is a front plan view of a vehicle seat embodying the present invention;

FIG. 2 is a side plan view of the vehicle seat shown in FIG. 1;

FIG. 3 is a top plan view thereof; and

FIG. 4 is an enlarged cross-sectional view taken on line 4—4 of FIG. 1.

Referring to the drawings, FIG. 1 shows a vehicle seat which is essentially comprised of a seat part 10, a back part 12 and supporting structure 14 which connects the two parts and maintains the back part in a position in which it will provide proper back support to an occupant of the seat. The seat part is a resilient cushion which is fixed to a metal understructure 16 which in turn may be fixed to a suitable pedestal or other support of the vehicle or machine with which the seat is to be used.

The supporting structure 14 is comprised of two upstanding metal side panels 18 which are bolted at 20 to the metal understructure of the seat part. Each side panel is connected to the back part by pivotal connecting means, shown generally at 22. The pivotal connection to the back part 12 is at a point substantially removed from the vertical mid-point 24 of the back part and thus permits adjustment of the back part position by pivoting it between the full and broken line positions shown in FIGS. 1 and 2. Both faces of the back part are suitably contoured and cushioned to provide proper back supporting surfaces in either of the two positions.

Each pivotal connecting means includes a bolt 26 which projects through an appropriate aperture 28 in one of the side panels 18 and which is fixed to a frame member 30 of the back part by a nut 32. The frame member is located underneath the covering skin 33 of the back part. A resilient rubber washer 34 is sandwiched between two cup washers 36 and exerts a bias on the inside surface of the panel 18 and on a metal plate 38 which is fixed on the side of the back member by screws 40. The bias exerted by the rubber washers is sufficient to maintain the back part in either of the two adjusted positions, yet it permits some movement of the back part when the occupant of the seat changes his sitting position and also permits the back part to be easily moved between the two adjusted positions. As the back part is pivoted, the bolt acts as an axle and the washer assembly exerts the necessary bias to this motion.

Although but one embodiment of the present invention has been illustrated and described, it will be apparent to those skilled in the art that various changes and modifications may be made therein without departing from the spirit of the invention or from the scope of the appended claims.

We claim:
1. A seat comprising:
  a generally horizontally disposed seat part;
  a generally vertically disposed back part;
  supporting means connecting said back part to said seat part to support said back part in a position in which it will provide back support to an occupant of the seat;
  pivotal connecting means connecting said back part to said supporting structure to permit said back part to pivot through 180° around an axis extending horizontally and transverse to the seat;
  said connecting means being connected to said back part at a point which is a substantial vertical distance removed from the vertical mid-point of said back part to thus place said back part at different heights above said seat part whenever said back part is pivoted through 180° around said axis; and
  said back part having back supporting surfaces on each of its sides to thus provide proper back support at said different heights.

2. A seat according to claim 1 wherein said connecting means is comprised of separate means located on each side of said back part, with each of said separate means including axle means projecting from said back part through apertures provided in said supporting means and resilient means which exerts a bias between said back part and said supporting means to provide limited resistance to the pivotal movement of said back part.

3. A seat according to claim 2 wherein said resilient means is comprised of a resilient washer sandwiched between cup-shaped washers, with said resilient and cup-shaped washers being mounted on said axle means between said supporting means and said back part.

References Cited

UNITED STATES PATENTS

| | | | |
|---|---|---|---|
| 1,248,915 | 12/1917 | Ricciardelli | 297—283 |
| 1,429,368 | 9/1922 | Owler et al. | 297—283 XR |
| 2,796,919 | 6/1957 | Ginsberg | 297—283 |

FOREIGN PATENTS 570,824  12/1957  Italy.

BOBBY R. GAY, *Primary Examiner.*
GLENN FINCH, *Assistant Examiner.*